June 1, 1965  H. NERWIN  3,186,318
PHOTOELECTRIC EXPOSURE CONTROL SYSTEMS FOR CAMERAS
Filed Dec. 3, 1962
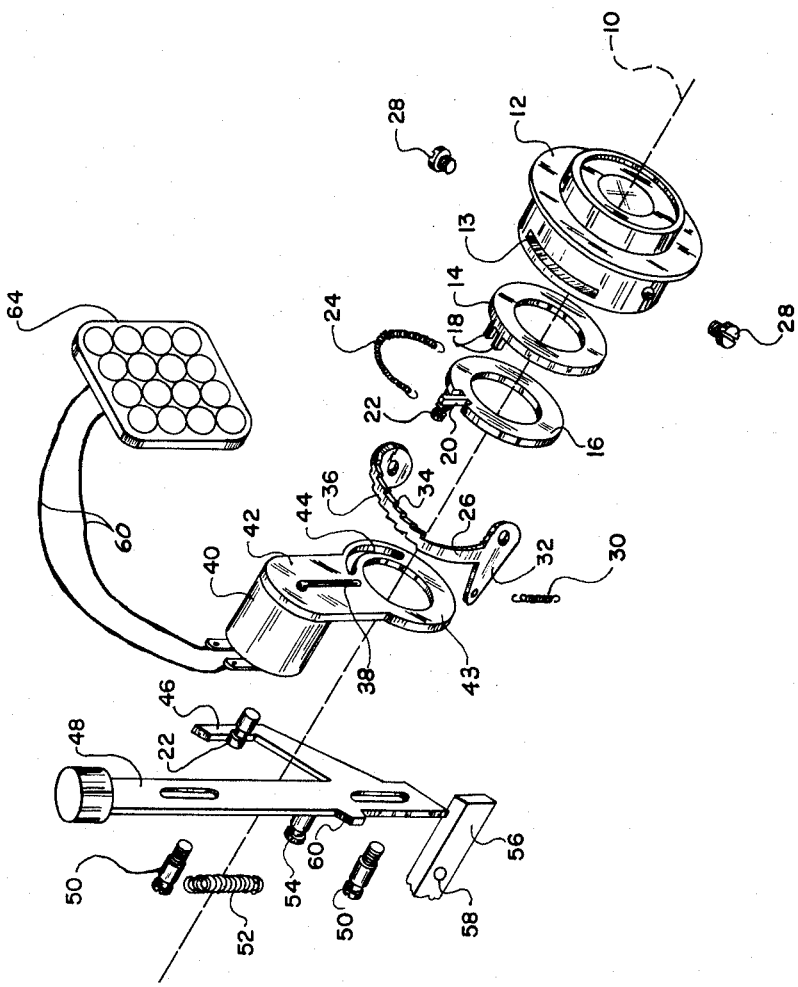
HUBERT NERWIN
INVENTOR.
BY
ATTORNEYS ated June 1, 1965

3,186,318
PHOTOELECTRIC EXPOSURE CONTROL SYSTEMS FOR CAMERAS

Hubert Nerwin, Rochester, N.Y., assignor to Eastman Kodak Company, Rochester, N.Y., a corporation of New Jersey
Filed Dec. 3, 1962, Ser. No. 241,658
5 Claims. (Cl. 95—10)

The present invention relates to photographic cameras, and more particularly concerns improved photoelectric exposure control systems for such cameras.

An object of the invention is to adjust the diaphragm and/or shutter of a camera by means of a simple, rugged and inexpensive mechanism co-operating with and controlled by the electric measuring instrument of a photoelectric light meter.

Another object of the invention is to pivot an arcuate bail for engaging a first sensing surface thereof with the pointer of a light meter illuminatable by field light, and to move a sensing member into engagement with a second sensing surface of the bail for adjusting a diaphragm and/ or a shutter, which is coupled to the sensing member, in accordance with the position of the bail. According to a related feature of the invention the electric measuring instrument of the light meter is positioned, in accordance with film sensitivity, within an arc substantially parallel to the arc formed by the bail, such that the adjustment of the diaphragm and/or shutter is a combined function of field brightness and film sensitivity.

Other objects of the invention will appear from the following description, reference being made to the drawing, which is an exploded isometric view of the invention as embodied in a camera.

Referring to the drawing, a mounting ring 12, a first exposure regulating device comprising a diaphragm setting ring 14 and a second exposure regulating device comprising a shutter speed setting ring 16 are mounted in a camera concentrically with an optical axis 10 thereof. Ring 12 is fixed; rings 14 and 16 are mounted for angular movement about axis 10. A pair of ears 18 on the diaphragm ring 14 bracket a sensing member 20 on the shutter speed ring 16, such that the diaphragm and shutter rings move together about the optical axis and establish predetermined pairs of diaphragm and shutter values in a manner well known in the art. Then sensing member 20 extends through an arcuate slot 13 in mounting ring 12, which limits the angular movement of the diaphragm and shutter rings.

An arcuate bail 26 is pivotally mounted by screws 28 on opposite sides of mounting ring 12 and is urged counterclockwise, as is shown in the drawing, by a spring 30 attached to an arm 32 of the bail. A first cam surface 36 of the bail is adapted to engage an output member comprising a pointer 38 of an electric measuring instrument 40, whereas a second cam surface 34 on the bail is adapted to be engaged by the sensing member 20. The measuring instrument 40 is connected by a pair of leads 60 to a photocell 64, which is adapted to be illuminated and energized by field light. Instrument 40 is mounted on an arm 42 of a ring 43, which is mounted for angular movement about the optical axis 10.

A pin 22 on the rear surface of shutter speed ring 16 extends through an arcuate slot 44 of ring 43 and co-operates with an arm 46 of a camera actuating member 48, which is mounted for vertical sliding movement on a pair of stub shafts 50. A spring 24 is connected to pin 22 and urges the diaphragm and shutter rings 14 and 16 clockwise, as viewed in the drawing, to maintain pin 22 in engagement with arm 46.

A spring 52 extends between the upper stub shaft 50, which is fixed, and a pin 54, connected to the camera actuating member 48, and urges the actuating member upward. An ear 60 of the actuating member underlies arm 32 of bail 26 and urges the bail clockwise against the tension of spring 30. Spring 52 is sufficiently strong to overcome the combined tensions of springs 24 and 30 and to maintain the actuating member at its maximum upward position, thereby maintaining the bail in its maximum clockwise position and the shutter and diaphragm rings in their maximum counterclockwise positions.

Upon an initial manual depression of the camera actuating member 48 ear 60 permits spring 30 to rock bail 26 counterclockwise to bring cam surface 36 into engagement with the instrument pointer 38 while the side of arm 46 holds pin 22 in the position shown. Upon further downward movement of actuating member 48, arm 46 moves sufficiently downward so that pin 22 can be moved clockwise across the top of arm 46 by spring 24. Shutter speed ring 16 and diaphragm ring 14 move clockwise with pin 22 until sensing member 20 comes to rest at cam surface 34 of bail 26. Accordingly, the full downward movement of actuating member 48 permits spring 30 to position the bail in accordance with the position of pointer 38 and permits spring 24 to position the shutter and diaphragm rings in accordance with the final position of the bail. Near the end of the downward stroke of actuating member 48, it engages a shutter tripping member 56, mounted on an axis 58, for tripping the camera shutter in a manner well known in the art.

The angular positioning of ring 43 about the optical axis 10 may be done manually or automatically as a function of film sensitivity or some other exposure factor. Bail 26 forms an arc of a circle approximately parallel to the locus of instrument 40 so that the bail always engages pointer 28 at the same position for any given value of field brightness. It will be seen that the final sensing position of the bail is a combined function of film sensitivity and field brightness.

The invention has been described in detail with particular reference to a preferred embodiment thereof, but it will be understood that variations and modifications can be effected within the spirit and scope of the invention as described hereinabove and as defined in the appended claims. In particular, it will be seen that either the diaphragm or the shutter may be fixed or adjusted separately, the other being adjusted automatically, as described.

I claim:
1. In a camera having an optical axis and having an adjustable exposure regulating device on said axis, a photoelectric control system for said regulating device, comprising: a photoelectric exposure meter energizable by field light and having an output member positioned in accordance with energization of said meter; a sensing bail pivotally mounted on said camera on opposite sides of said optical axis and forming an arc extending partially around said axis, one side of said arc forming a first sensing surface engageable with said output member to position said bail as a function of the energization of said meter; a second sensing surface formed on a second side of said arc; a sensing member coupled to said exposure regulating device and movable for adjusting the latter; and means for moving said sensing member into engagement with the second sensing surface on said bail for adjusting said regulating device in accordance with the position of said bail.

2. The control system defined in claim 1, wherein said exposure regulating device comprises a diaphragm.

3. The control system defined in claim 1, wherein said exposure regulating device comprises a shutter.

4. The control system defined in claim 3, with: an adjustable diaphragm; and means coupling said diaphragm to said shutter for adjusting the former along with adjustment of the latter.

5. The control system defined in claim 1, wherein said output member is pivotally mounted on a measuring instrument, with means for moving a portion of said meter, including said instrument, in an arcuate path substantially parallel to the arc of said bail to position said instrument as a function of an exposure factor, whereby the position of said bail, when its first sensing surface engages said output member, is a combined function of said exposure factor and the energization of said meter.

References Cited by the Examiner
UNITED STATES PATENTS 3,086,433 4/63 Kaden _____ 95—10
3,086,435 4/63 Hennig _____ 95—10

NORTON ANSHER, *Primary Examiner.*
JOHN M. HORAN, *Examiner.*